(No Model.) 4 Sheets—Sheet 2.
H. THOMAS.
CASH CARRIER.
No. 368,029. Patented Aug. 9, 1887.
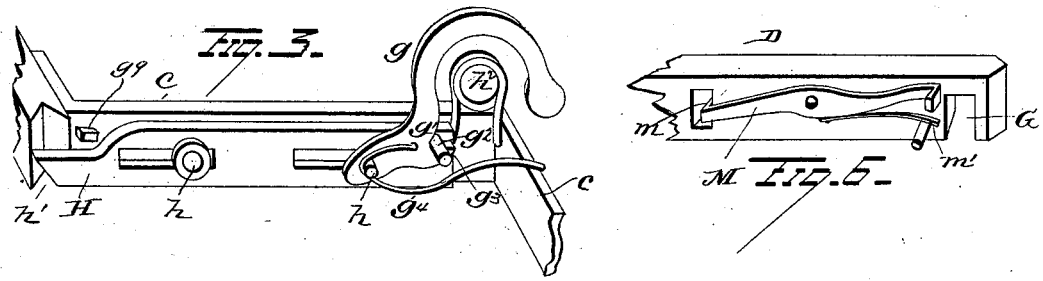
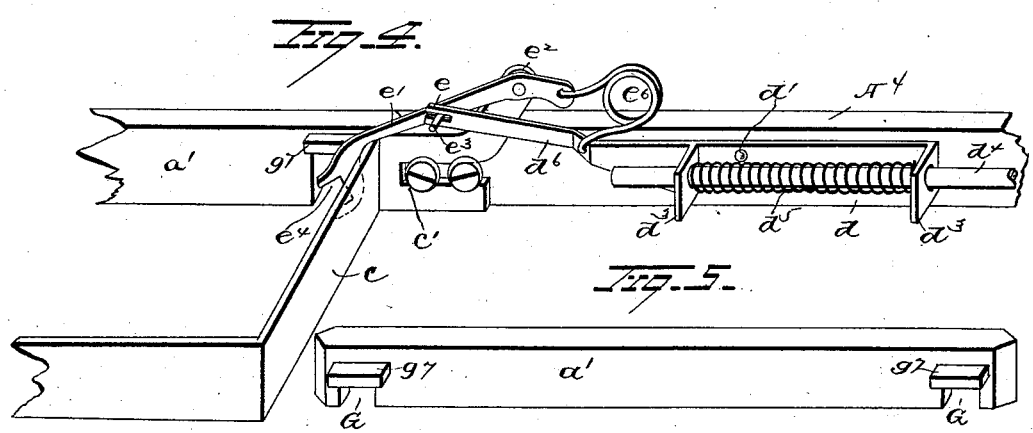
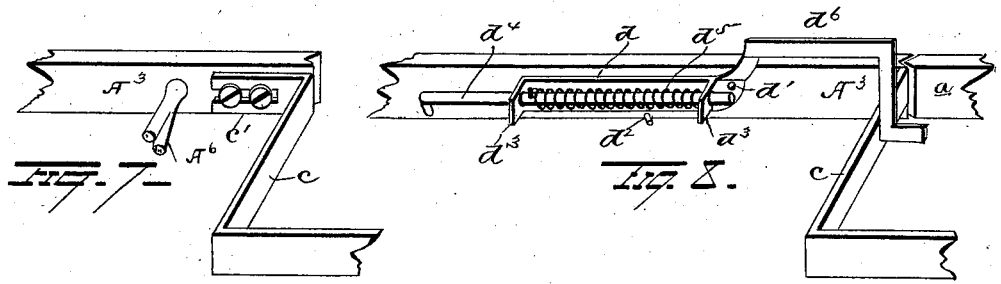
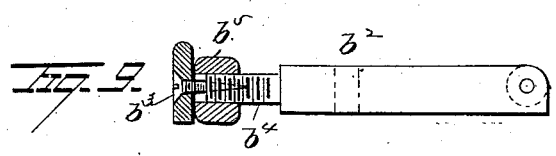
WITNESSES
Geo. P. Downing.
S. G. Nottingham.
INVENTOR
Horatio Thomas
By H. A. Seymour
Attorney (No Model.) 4 Sheets—Sheet 3.
H. THOMAS.
CASH CARRIER.
No. 368,029. Patented Aug. 9, 1887.
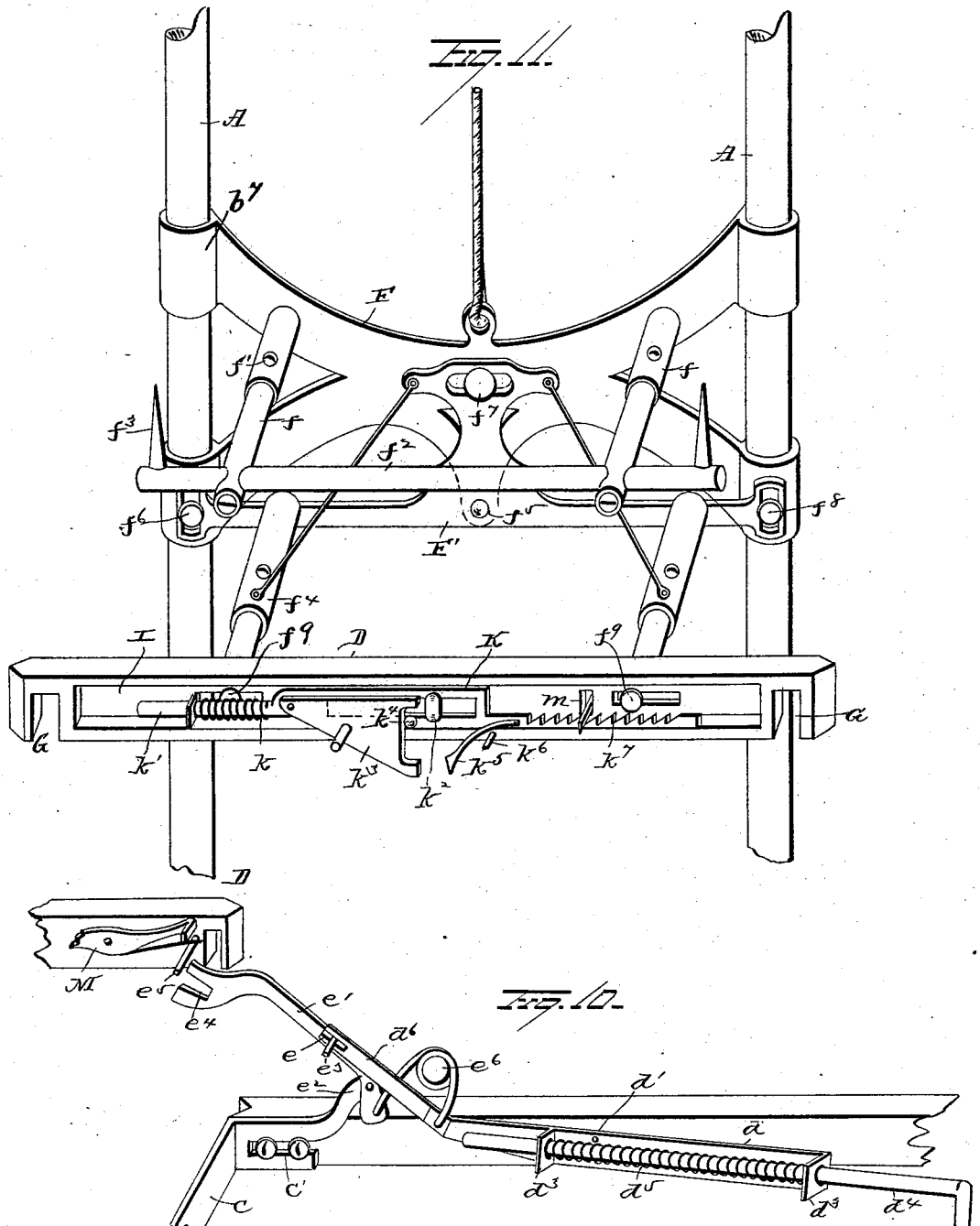

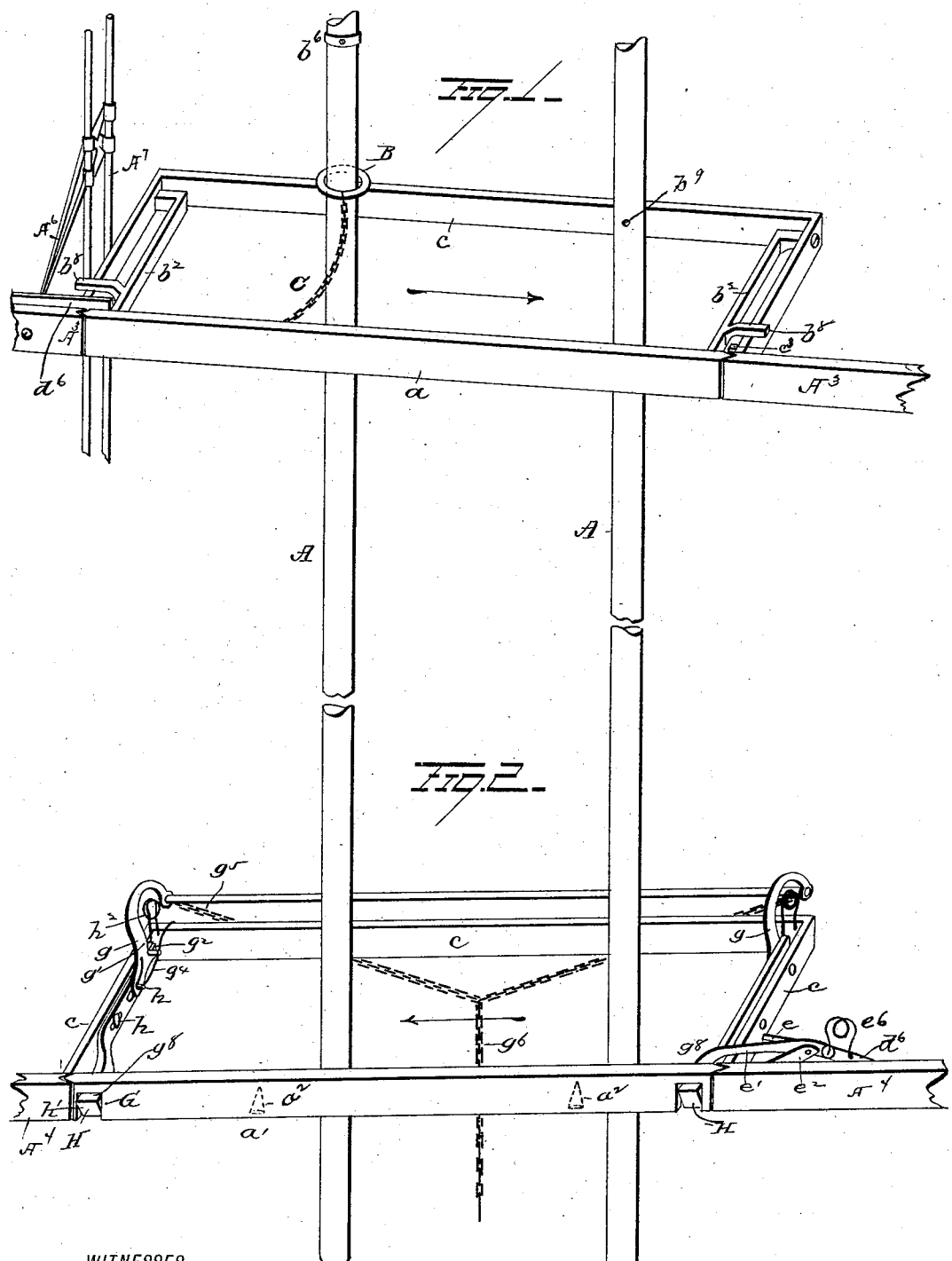

(No Model.)  H. THOMAS.  4 Sheets—Sheet 4.
CASH CARRIER.
No. 368,029.  Patented Aug. 9, 1887.
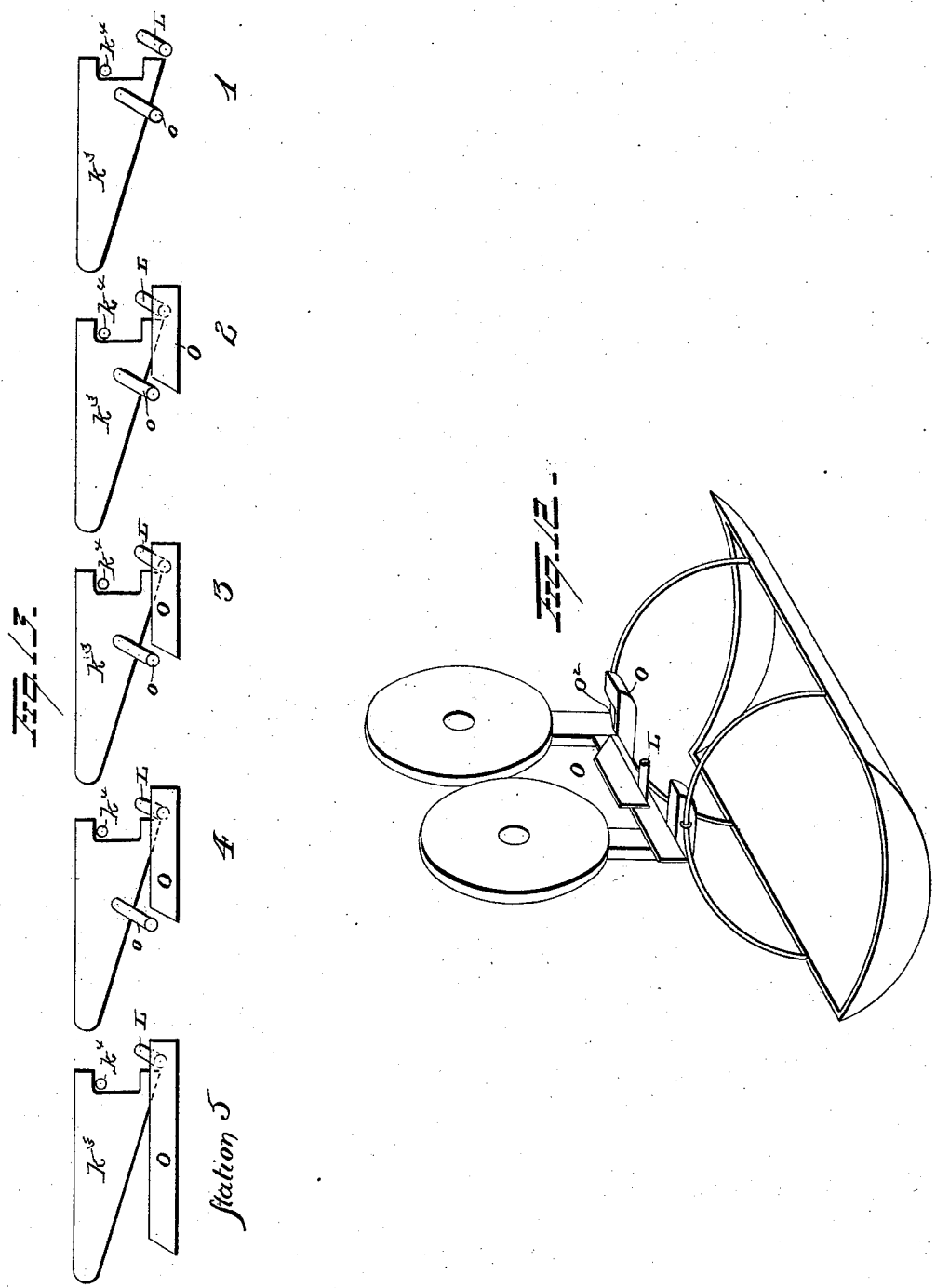
WITNESSES
Geo. F. Downing.
S. G. Nottingham.
INVENTOR
Horatio Thomas
By H. A. Seymour, Attorney

UNITED STATES PATENT OFFICE.

HORATIO THOMAS, OF CHICAGO, ILLINOIS, ASSIGNOR TO THE BOSTEDO CASH AND PACKAGE CARRIER COMPANY, OF ATLANTIC, IOWA.

CASH-CARRIER.

SPECIFICATION forming part of Letters Patent No. 368,029, dated August 9, 1887.

Application filed August 27, 1886. Serial No. 212,010. (No model.)

*To all whom it may concern:*

Be it known that I, HORATIO THOMAS, of Chicago, in the county of Cook and State of Illinois, have invented certain new and useful Improvements in Store-Service Apparatus; and I do hereby declare the following to be a full, clear, and exact description of the invention, such as will enable others skilled in the art to which it appertains to make and use the same.

My invention relates to an improvement in and more particularly on the apparatus for which application for Letters Patent was filed by L. G. Bostedo on the 2d day of August, 1886, Serial No. 205,639.

The object is to provide improved means for removing the upper-track section and to provide a stop to prevent the running of cars from other stations into the opening.

A further object is to provide means for arresting and dispatching the cars or baskets.

With these ends in view my invention consists in certain features of construction and combinations of parts, as will be hereinafter described, and pointed out in the claims.

In the accompanying drawings, Figure 1 is a view of a portion of the upper or forwarding track, showing one removable section. Fig. 2 is a view of a portion of the lower or return track, also showing a removable section. Figs. 3, 4, 5, 6, 7, 8, 9, and 10 represent detached views of the several parts in detail; Fig. 11, the elevator; Fig. 12, the car or basket; Fig. 13, a series of latches corresponding to a series of stations arranged in order from the cashier's desk.

A A represent a pair of upright guide-rods, on which the elevator is adapted to slide up and down. One of the guide-rods A has a loosely-fitting ring, B, thereon, to which is fastened one end of a chain, C, the opposite end of the chain being attached to the removable track-section $a$ of the forwarding-track on the side toward the guide-rod. When the elevator is raised, the part $b^1$, which grasps the guide-rod, will engage the ring B and slide it up the guide-rod, and will thereby, the chain being adjusted the proper length, raise the removable track-section $a$ out of its position just before the lower removable track-section, $a'$, carried on the upper arms, $f^2$, of the elevator, reaches the line of the upper or forwarding track. A stationary stop, $b^6$, limits the upward movement of the elevator, stopping it at the point where the elevator-track section D will be flush with the upper face of the forwarding-track, or the ring B might be permitted to rise until arrested by the chain, and thus dispense with the use of the stop $b^6$. The upper-track section $a$ will drop back into its position by gravity when the elevator is lowered.

The manner of securing the forwarding-track section $a$ to the swinging arm $b^2$ is shown in Fig. 9, in which a screw, $b^3$, extends through the track into the end of a threaded tap or projection, $b^4$, on the end of the arm $b^2$, and a nut, $b^5$, is adapted to work on the said threaded tap or projection and bear against the side of the track. The track-section is thus rendered adjustable toward and away from the guide-rods and caused to assume the proper position with reference to the ends of the main track. The arms $b^2$ are provided with fingers $b^8$, adapted to overlap the braces $c$ and limit the downward movement of said arms.

The brace $c$, which connects the ends of the stationary sections of the forwarding and return tracks, is secured by bolts $b^9$ or otherwise to the guide-rods A, and has slotted ends, as shown at $c'$, Fig. 7, to admit of its being shifted slightly in the line of the track. The forwarding-tracks $A^3$ and return-tracks $A^4$ are supported by brackets $A^6$, secured to the upright standards $A^7$. (Shown in Fig. 1.)

To arrest cars or baskets traveling on the forwarding-track when the elevator is being raised or lowered through said track a stop is provided. (Shown in detail in Fig. 8.) It consists of a plate or flat bar, $d$, pivoted to the back side of the forwarding-track $A^3$, as shown at $d'$, and limited in its downward swing by a pin, $d^2$, or its equivalent. The plate or bar $d$ is provided with a pair of ears, $d^3$, in which a rod, $d^4$, is adapted to slide. A spiral spring, $d^5$, is located on the rod $d^4$ between the ears, one end of which is secured to the rod and the other adapted to bear against one of the ears, thereby forming a spring-cushion for the rod. An arm, $d^6$, is secured rigidly to the end of the plate toward the removable track-section $a$, and, after extending away from the track a short distance to clear the car, extends over the side of the brace c and down between the side of the brace and the swinging arm $b^2$, as shown in Fig. 1, and beneath the swinging arm. When the track-section a is lifted from its position, the end of the arm $d^5$ will be set free, and the stop rod $d^4$, projecting from the free end of the plate d, will tilt downwardly with the plate by gravity, or by the tension of a spring, until the plate strikes the pin or rest $d^2$, when the end of the rod $d^4$ will be in a position below the track to arrest a car traveling toward the removed section. The cushioning of the stop-rod $d^4$ prevents jarring or bruising from the impact of the car.

The stop for arresting the cars or baskets on the lower or return track, $A^4$, when the lower-track section is removed is quite similar in its general construction to that just described as used on the upper track. The operating-arm $d^6$ is, however, somewhat modified in shape, as shown in Fig. 4, and terminates a short distance from the side of the lower brace, c, in the form of a fork, or is provided with an elongated open slot, e. An operating-lever, e', is pivotally secured to a projection, $e^2$, on the end of the lower brace, c, and is provided with a laterally-extending pin, $e^3$, which works in the slot e, formed in the end of the arm $d^6$. One end of the lever e' projects over the side of the lower brace, c, and is provided with a pair of open jaws, $e^4$, which are adapted to receive between them a pin, $e^5$, (shown in Fig. 10,) on the elevator-track section D on both its upward and downward passage, and the jaw end of the lever e' will be thereby thrown up or down and the stop-rod thrown below the track, where it will engage the car, or up by the side of the track, where the car will have free passage. A double-acting spring, $e^6$, consisting, preferably, of a wire or band bent in the form of a loop at the central portion and its ends bent down outside of the loop and secured one to the arm $d^6$ and one to the short arm of the lever e', tends to hold the lever e' in a depressed position when it has been forced there, and also in an elevated position when it has been forced there, the stroke of the lever either up or down being sufficient to throw it past center with respect to the tension of the spring. This lower stop will thus arrest the cars or baskets when the elevator is above the lower track, but will allow them to pass freely when at or below. The positions which the lower stop assumes to admit of the free passage or cause the arrest of the cars or baskets are shown in Figs. 4 and 10, respectively.

The elevator hereinabove referred to has the same general construction as that shown and described in the application hereinbefore referred to. It consists of a skeleton frame, F, the ends of the four arms of which partially embrace the guide-rods A.

A pair of upper forwardly-extending arms, f, are attached to the frame F, and preferably rendered adjustable in length by their telescopic construction, set-screws f'' being employed to lock the male sections within the female sections. The arms f support at their ends a bar or rod, $f^2$, provided with a pair of upwardly-extending prongs, $f^3$, the object of which is to enter sockets $a^2$ in the lower removable track-section, a', as the elevator ascends and carry the said removable section up with the elevator.

To the elevator-frame F is secured an auxiliary frame, F', also provided with a pair of outwardly-extending arms, $f^4$, the latter being preferably of telescopic construction and adjustable in length. The frame F' is secured to the frame F by a pivotal bolt, $f^5$, or its equivalent, and is allowed a limited rocking adjustment on the bolt by means of three securing-bolts or set-screws, $f^6$, $f^7$, and $f^8$, which work in elongated slots formed in the three branches of the frame F'. The object of such rocking adjustment is to enable the elevator-track section D to assume the different slants of the forwarding and return tracks as it is brought into alignment therewith. The elevator-track section D, the construction of which will be hereinafter more fully explained, is secured to the ends of the arms $f^4$ by means of binding-screws $f^9$, which extend through elongated slots in the track-section, and hence admit of its longitudinal adjustment relatively to the arms.

Both the lower-track section a' and the elevator-track section D are provided with notches G, cut in their under sides near their ends, as shown in Figs. 2 and 5, to admit of their resting on the ends of the bolts H, with their upper faces flush with the main tracks. The bolts H are secured in a limited longitudinally-sliding adjustment to the inner faces of the sides of the lower brace, c, by means of pins or studs h, carrying anti-friction rollers extending through elongated slots in the bolts and into the sides of the brace. The ends of the bolts H are beveled on the under side, as shown at h', so that when the elevator is raised the elevator-track section D will force the bolts back and pass upwardly without hinderance. The bolts H will automatically resume their advanced positions as soon as the elevator has passed, because of springs $h^2$, the tension of which tends to keep the bolts in advanced adjustment. Thus when the elevator has been raised and a car or basket dispatched it may be lowered into its receiving position, with its track-section D resting on the bolts H, and remain there until its car or basket returns. While so remaining, all cars or baskets, excepting its own, will be allowed to pass without interruption, as will hereinafter appear.

To lower the elevator when its car or basket has been received, it is necessary to withdraw the bolts H. This is accomplished as follows: A pair of curved levers, g, are secured in rocking adjustment, one on each of the pins or studs h at the rear ends of the bolts H, and are provided with cam-faces g' at their rear edges, adapted to engage pins $g^2$, set in the sides of the bolts. They are also provided with projections $g^3$, which bear against the under sides of the pins $g^2$, and are normally held in engagement therewith by the tensions of springs $g^4$. The free ends of the levers $g$ project over the back of the lower brace, $c$, and are united by a chain, $g^5$, from the center of which an operating cord or chain, $g^6$, depends within reach of the operator. By pulling downwardly on the cord or chain $g^6$ the cam-faces of the levers are forced against the pins $g^2$, and the bolts H thereby forced backwardly out of engagement with the elevator-track section, which is then free to be lowered. The lower-track section $a'$ is prevented from passing downwardly through the opening in the lower track, even though the bolts H be withdrawn, by rearwardly-extending lugs $g^7$, formed thereon, which are adapted to engage projections $g^9$, formed on the back of the main track or on the sides of the brace $c$ when the track-section $a'$ is flush with the main track $A^4$, or by engaging the ends of the bolts H, which, when withdrawn from under section $a'$, would still rest under the projections $g^7$.

The car or basket is arrested on the elevator-track section D as follows: The said section is hollowed out on its front side, as shown at I, Fig. 11, to make room for the several parts. Within the hollowed-out portion I is located a longitudinally-sliding plate or bar, K, cushioned in the direction in which the returning cars travel by a spiral spring, $k$, surrounding its plunger-extension $k'$. The plate of bar K is limited in its sliding movement by a securing bolt or screw, $k^2$, which extends through an elongated slot in the plate into the track-section. To the front side of the sliding plate K is pivoted an abutment, $k^3$, the free end of which is allowed to fall below the track-section D sufficiently far to intercept a laterally-extending pin, L, on the car, Fig. 12. The abutment $k^3$ is limited in its downward swing by a pin, $k^4$, set in the side of the plate K. A curved latch, $k^5$, is also pivoted at one end to the plate K, its free end lying toward and a short distance from the end of the abutment $k^3$. It assumes a depending position by gravity, and is held in the proper elevation by a pin, $k^6$, set in the lower edge of the track. The end of the sliding plate toward the approaching car is provided with a set of ratchet-notches, $k^7$, which are engaged by a pawl, $m$, projecting through the track-section from the side toward the guide-rods. The pawl $m$ is the bent end of or is attached to the end of a lever, M, pivoted to the back side of the track-section and having its pawl end held in a depressed position by a spring, $m'$, the lever M and spring $m'$ being shown in Fig. 6. As the car rolls onto the elevator-track section the pin L on the car lifts the free end of the latch $k^5$ or slides beneath it into contact with the end of the abutment $k^3$, and as soon as it has passed the latch $k^5$ drops and prevents the car from rebounding. The force of the car against the abutment causes the plate K to slide, compressing the spring-cushion $k$ and gradually bringing the car to a standstill, while the pawl $m$, sliding over the notches $k^7$, retains the plate K in its position and thereby stores up energy to be expended as follows: When the elevator is raised with car thereon to the forwarding-track, the end of the lever M engages a stop, $c^3$, on the upper brace, $c$, just before the elevator-track section is flush with the main track, and causes the pawl $m$ to disengage the notches $k^7$ just as the said section becomes flush. This allows the plate K, by the tension of the spring $k$, to quickly return to its normal position, thereby giving the car an impulse toward the cashier's desk. The sliding of the plate K at the same time draws the latch $k^5$ over its rest $k^6$, thereby elevating its free end sufficiently to set free the car.

The cars are allowed to pass all stations, excepting their own, as follows: Each car is provided with a bevel-ended plate, O, which extends far enough in advance of the pin L to engage the pins $o$ on the abutments and thereby lift the abutments out of the way of the car. The pins $o$ are set at different distances from the free ends of the abutments, so that the car will lift all the abutments until it reaches one on which the pin $o$ is so far from its face that the pin L on the car will engage the abutment before the bevel-ended plate O engages the pin $o$, and that will be the station for that car. Of course the gradual lengthening of the plates O on the cars designed for the several stations would accomplish the same purpose as the setting of the pins $o$ at different distances from the ends of the abutments; or both expedients might be resorted to in the same system. Fig. 13 represents a series of abutments corresponding to a series of five stations, showing the positions of the pins $o$ and the bevel-ended plates O at their respective stations. At station No. 1 there would be no need of a plate O on the car to be stopped there, while at station No. 5, or the last station, there would be no need of a pin $o$ on the abutment, since the car for station 1 would not have to pass any station, and no car would have occasion to pass the last station.

The guard $o'$ at the front of the car, which extends under the track to prevent the car from jumping the track, is provided with a beveled notch, $o^2$, which enables it to lift the latches and abutments which it may be required to pass.

Having fully described my invention, what I claim as new, and desire to secure by Letters Patent, is—

1. In a store-service apparatus, the combination, with a removable upper-track section and an elevator guide-rod, of a slide secured on the guide-rod and connected with the said removable section, whereby the upward movement of the elevator removes the section, substantially as set forth.

2. In a store-service apparatus, the combination, with a swinging track-section and an elevator guide-rod, of a ring loosely mounted on the guide-rod and connected with the swinging track-section and an elevator adapted to engage the ring and remove the section, substantially as set forth.

3. In a store-service apparatus, the combination, with the stationary sections and the movable section located in a line with and forming a continuation of said stationary sections, of a car-arrester pivotally secured to one of said stationary sections and adapted to be thrown into position to stop the car by the upward movement of the movable section, substantially as set forth.

4. In a store-service apparatus, the combination, with a track, of a car-arrester consisting, essentially, of a yielding plunger or stop secured to a tilting lever, the latter being secured to the side of the track and adapted to retain its tilted adjustment, substantially as set forth.

5. In a store-service apparatus, the combination, with a yielding stop secured to the main track and adapted to be tilted, of a stop-operating lever adapted to engage the car-elevator and a double-acting spring adapted to lock the operating-lever in both depressed and elevated positions, substantially as set forth.

6. In a store-service apparatus, the combination, with a tilting stop secured to the main track, of a stop-operating lever pivotally secured to a projection on the track-supporting brace and a double-acting spring attached to the operating-lever and to the stop-support, the said spring being adapted to lock the operating-lever in both a depressed and an elevated position, substantially as set forth.

7. In a store-service apparatus, the combination, with a pair of spring-actuated sliding bolts adapted to support a removable track-section, of a pair of bolt-operating levers and lever-operating mechanism leading to a point within reach of the operator, substantially as set forth.

8. In a store-service apparatus, the combination, with a pair of bevel-ended spring-actuated bolts adapted to support a removable track-section, of a pair of spring-actuated bolt-operating levers and mechanism for operating the said levers, and hence the bolts, simultaneously, substantially as set forth.

9. In a store-service apparatus, the combination, with a removable track-section, of a car-elevator provided with a supplemental track-section and a spring-actuated device secured to said supplemental track-section for stopping a car on and dispatching a car from the elevator-track section, substantially as set forth.

10. In a store-service apparatus, the combination, with an elevator-track section adapted to supply the positions of removable track-sections, of a yielding abutment secured to said elevator-track section and adapted to store the energy of the car brought to a stop thereon, substantially as set forth.

11. In a cash and package carrier system, the combination, with an elevator-track section adapted to supply the positions of removable track-sections, of a yielding abutment secured to said elevator-track section and adapted to store the energy of the car brought to a stop thereon and to expend said energy in starting a car, substantially as set forth.

12. In a store-service apparatus, the combination, with a car receiver and elevator, of a spring-actuated stop carried by the car-receiver and adapted to store the energy of a car brought to a stop by the same and to automatically expend said energy in starting the car, substantially as set forth.

13. In a store-service apparatus, the combination, with an elevator-track section adapted to occupy the positions of removable track-sections, of the yielding abutment and the ratchet and pawl for locking the abutment in compressed adjustment, substantially as set forth.

14. In a store-service apparatus, the combination, with forwarding and return tracks having removable sections, of an elevator-section adapted to occupy the position of the removable track-section and the yielding vertically-swinging abutment secured to said elevator-section, substantially as set forth.

15. In a store-service apparatus, the combination, with the yielding vertically-swinging abutment secured to the elevator-section, of the gravity-latch adapted to lock the car on the elevator-section, substantially as set forth.

16. In a store-service apparatus, the combination, with the yielding abutment secured to the elevator-section and provided with a series of ratchet-teeth, of the spring-actuated pawl adapted to engage the teeth when a car is being received and to release the teeth when a car is being dispatched, substantially as set forth.

17. In a store-service apparatus, the combination, with a series of abutments secured to a series of elevator-track sections, of cars provided with bevel-plates adapted to lift all abutments, excepting their own, out of their way in passing, substantially as set forth.

18. In a store-service apparatus, the combination, with a car-elevator, of a track-section remover secured to the elevator by a pair of longitudinally-adjustable arms, substantially as set forth.

19. In a store-service apparatus, the combination, with a car-elevator frame, of an elevator-track section secured to the frame at two points and adapted to be adjusted laterally and longitudinally, substantially as set forth.

In testimony whereof I have signed this specification in the presence of two subscribing witnesses.

HORATIO THOMAS.

Witnesses:
L. G. BOSTEDO,
BENJAMIN F. STRAUS.